Rate of Particle Growth of $Fe_2O_3$ Particles at 80° C

Rate of Particle Growth of $Fe_2O_3$
Particles at 100°C

United States Patent Office 3,267,041
Patented August 16, 1966

3,267,041
PREPARATION OF FERRIC OXIDE SOLS
AND SOL PARTICLES
Robert B. MacCallum, Fairfield, Conn., assignor to W. R. Grace & Co., New York, N.Y., a corporation of Connecticut
Filed June 18, 1962, Ser. No. 203,363
2 Claims. (Cl. 252—313)

The invention relates to ferric oxide sols and to new and useful improvements in the manufacture of such sols. Especially, this invention relates to a process for making ferric oxide sols in which the particles comprising the sols are discrete and uniform in size and shape.

Ferric oxide is extensively used as a pigment for rubber, paints, paper, linoleum and ceramics. The high-grade powder obtained from ferric oxide sols is used as a polishing agent for glass, precious metals, and diamonds. As well, it is used in the manufacture of magnetic materials such as ferrites and garnets.

Numerous methods for the production of ferric oxide are available in the prior art. For example, commercial grade ferric oxide has been manufactured by corroding scrap iron, by circulating a solution of ferrous sulfate through a body of scrap iron, while at the same time aerating, for a period of a week or more.

A second common method is the precipitation of ferric oxide from iron salt solutions with alkaline reagents, followed by oxidation of the precipitate. However this method, like the first, yields only commercial grade ferric oxide, which is entirely unsuited to the manufacture of polishing compounds and magnetic materials.

The fact that ferric oxide sols can be prepared by boiling a solution of ferric acetate at about 100° centigrade was disclosed by Pean de St. Gilles in 1855. However, it has been found that little control over the particle size can be achieved if the hydrolysis is run at 100° centigrade—except by seeding.

We have found that a ferric oxide sol of high quality can be prepared by peptization of freshly precipitated ferric hydroxide with acetic acid followed by growth of the crystals by heating from 80 to 100° centigrade.

It is an object of this invention to prepare ferric oxide sols in which the particle size can be controlled and varied at will and the particles of which are discrete and uniform in size and shape.

This invention is based on the following discoveries: (1) That by running the hydrolysis below 100° centigrade and above about 60° centigrade, preferably at about 80° centigrade, much better control of the particle size can be achieved. (2) By seeding a solution of ferric acetate before it is hydrolyzed, irrespective of temperature, particle size can be substantially increased over the earlier method. (3) The particle shape produced at 80° centigrade and by seeding at either temperature is ellipsoidal, whereas the particle shape produced at 100° centigrade is essentially spheroidal; i.e., the particles show more tendency to axial orientation than in prior methods.

It has been found, that if ferric acetate is hydrolyzed at 100° centigrade and the hydrolysis or particle growth is allowed to go to completion, the particle size of the completed sol is essential independent of the concentration of ferric oxide or acetic acid. The particles are spherical with a mean diameter of about 70 m$\mu$. Therefore, the particle size must be controlled by stopping the hydrolysis at some predetermined time by which the particles have grown to a desired size. The particles can then be separated from the mother liquor and redispersed. At 100° centigrade the rate of hydrolysis is so fast that particle size cannot be very well controlled by this method. This is because the ferric acetate solution must be heated at least one hour and a half before the particles being formed are discrete; and at the end of two hours of refluxing, the particles have grown to approximately 65% of their final volume or size.

If the hydrolysis is run at 80° centigrade, the rate of particle formation is significantly slower. This results in a much wider selection of sizes.

Figure 1:
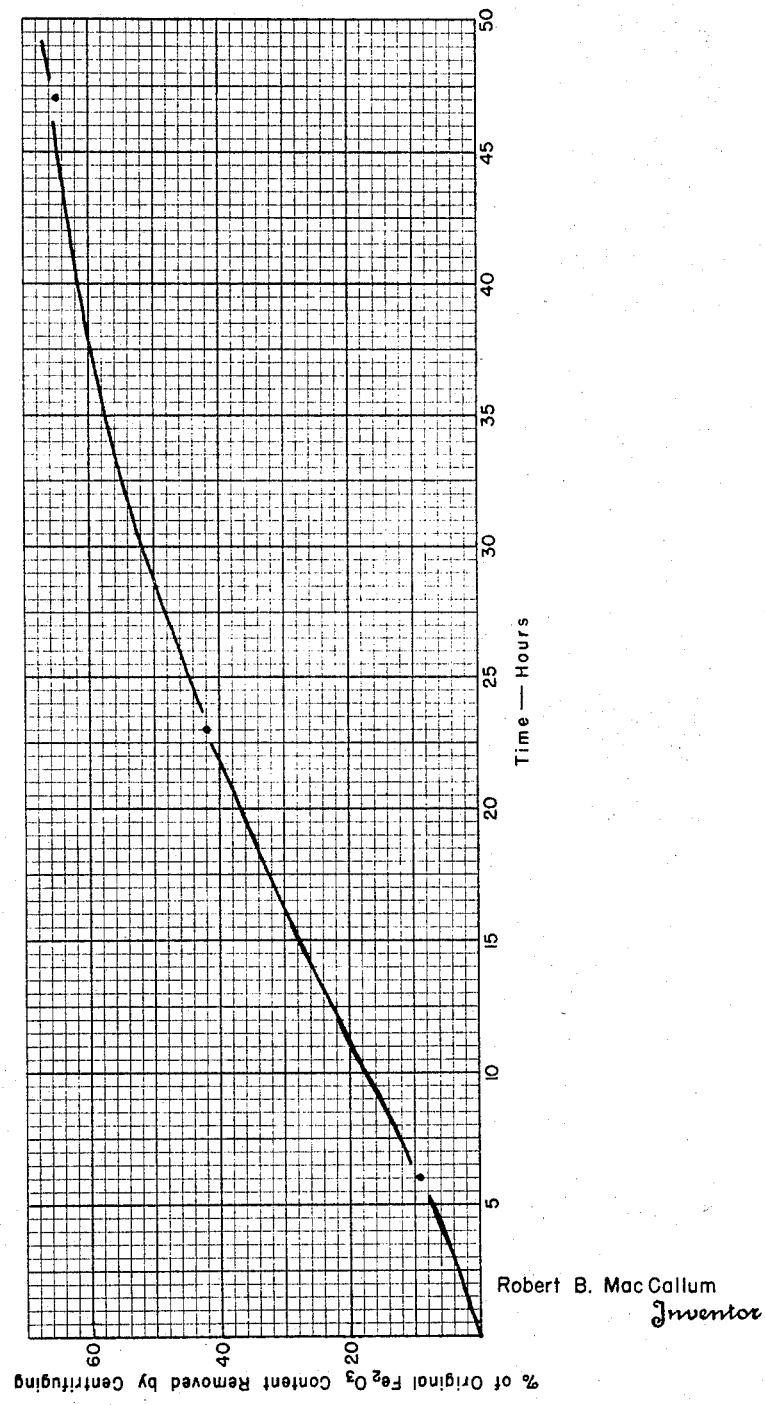
FIGURES 1 and 2 show the rate of $Fe_2O_3$ particle growth.
Figure 2:
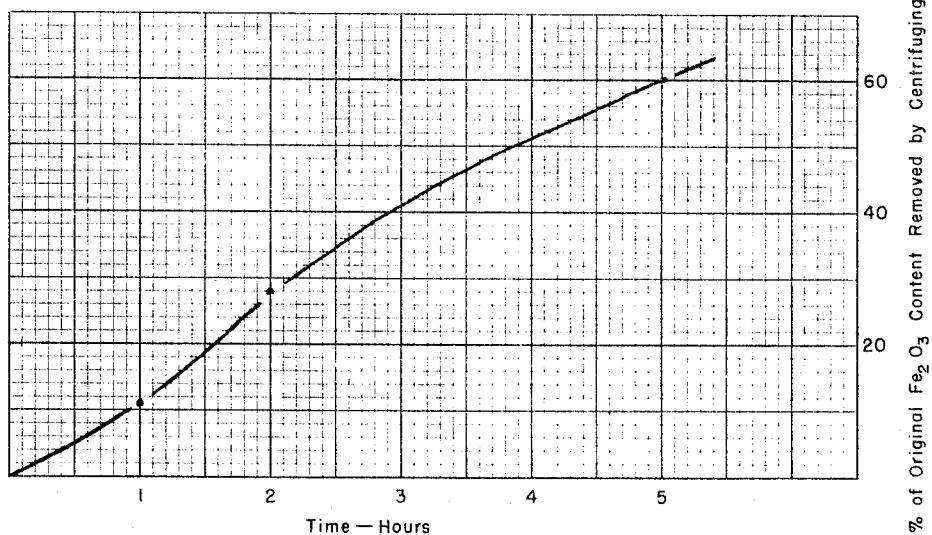

The general procedure is as follows: Hydrous ferric oxide is precipitated from a solution of a ferric salt with a base and then washed free of electrolytes. The hydrous ferric oxide is suspended in a dilute solution of acetic acid until a clear red solution results. Evidence points to the fact that the hydrous ferric oxide is peptized into extremely small particles by the acetic acid but the old concept of solution to ferric acetate has been used in this description. This clear red solution is then heated in a reflux apparatus to obtain particle growth to the desired size. The time at which the particle growth should be terminated can be calculated from the rate of particle growth curve (FIGS. 1 and 2) working back from the size of the finished particle as follows:

For a sphere:

$$D \text{ at time } A = \sqrt[3]{\frac{\left(\begin{array}{c}\text{Percent } Fe_2O_3 \text{ as}\\ \text{particles at time } A\end{array}\right) D^3 \text{ of finished particle}}{100}}$$

However, experimentation is more reliable. The solution is cooled quickly to room temperature; the particles are separated from the mother liquor and redispersed. Continued heating of the mother liquor afterwards will produce additional particles. The volume of water used to redisperse the particles can be varied according to the desired concentration.

The $Fe_2O_3$ content of the starting solution should not exceed 5% nor should the mole ratio of acetic acid to ferric oxide exceed 4 to 1. The method used to separate particles from the mother liquor was centrifugation. If the hydrolysis has gone to completion and the only impurity in the sol is acetic acid, centrifugation or ion exchange can be used to purify the sol. The particles can be concentrated by flocculation with an electrolyte and settling. The acetic acid is decanted. The particles are then redispersed in water and passed through a mixed bed resin to deionize them.

It has been found that the particle size can be further increased by adding seed—previously prepared sol particles—to the clear red solution before it is heated in order to serve as nuclei for growth of particles. The temperature at which the seeded, clear, red solution is heated can be either 80° centigrade or 100° centigrade. The particles resulting have a bi-modal distribution: large footballs or ellipsoids, resulting from particle growth on the seed, and smaller particles. The two size modes can be separated by fractional centrifugation and redispersed. Methods of controlling particle size are: (1) the ratio of $Fe_2O_3$ in solution to $Fe_2O_3$ as seed, (2) the size of the seed, (3) time of heating as described above, and (4) temperature at which heating is carried out. The seed must be previously dispersed in water or dilute acetic acid before addition to the ferric acetate solution. The $Fe_2O_3$ content of the seeded ferric acetate solution after the final dilution should be about 1% and the acetic acid concentration should be about 3%.

The following examples are illustrative of my invention and in no way are intended to be limiting upon its scope.

Figure 3:
FIGURES 3, 4, 5 and 6 illustrate $Fe_2O_3$ particle size and shape after various times of growth at 80° C.
Figure 4:
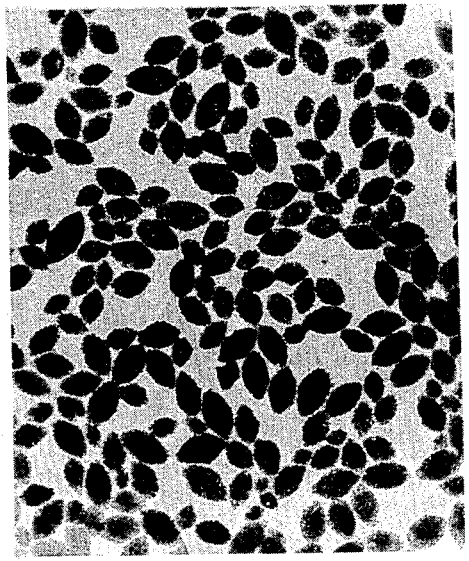
Figure 5:
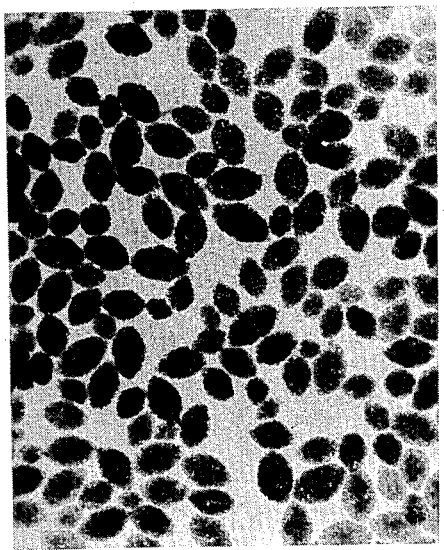

EXAMPLE I 22.7 grams of $Fe(NO_3)_3 \cdot 9H_2O$ were dissolved in 100 ml. of water and precipitated with 30 ml. of aqueous ammonia (28%) with stirring. The precipitate was filtered and redispersed in water four times. The conductivity of the final dispersion 80 ml., was 0.00055 mho. 12.5 ml. of glacial acetic acid were added and stirred gently for 18 hours. The solution was diluted to 400 ml. and placed in a reflux apparatus maintained at a temperature of 80° centigrade. The solution, or sol, was heated at 80° centigrade with stirring and samples withdrawn and cooled quickly to room temperature at 6, 23, and 47 hours. The samples were centrifuged at 10,000 r.p.m. for 30 minutes. The supernatant after centrifuging was analyzed for iron to determine how much of the $Fe_2O_3$ had formed particles large enough to be centrifuged out. The particles thrown down were redispersed in water and an electron micrograph taken of the samples representing each withdrawal (FIGS. 3, 4, 5). The micrographs show a definite growth pattern with increasing time. The scale of the photomicrographs is 1 cm.=500 A.

Figure 6:
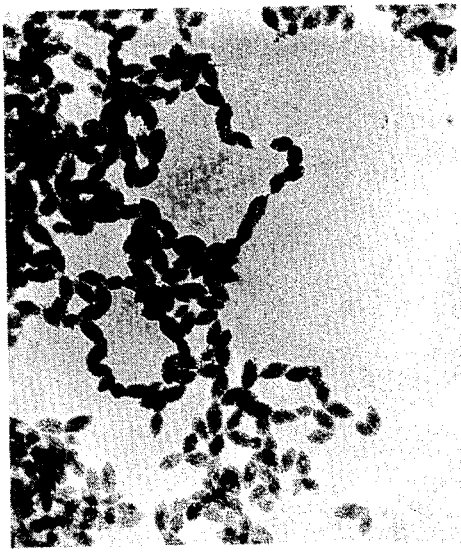

EXAMPLE II 22.7 gms. of $Fe(NO_3)_3 \cdot 9H_2O$ were dissolved in about 200 ml. of water and precipitated with 25 ml. of aqueous ammonia (28%) with stirring. The precipitate was filtered and redispersed in water five times until the conductivity of the final dispersion, 200 ml. in volume, was 0.00067 mho. 12 ml. of glacial acetic acid were added and stirred gently for 15 hours. The solution was made up to 400 ml. with water and placed in a reflux apparatus maintained at a tempertaure of 80° centigrade. The solution was heated for 4 hours at 80° centigrade with stirring after which a portion was cooled quickly to room temperature. The sample was centrifuged at 10,000 r.p.m. for 30 minutes. The supernatant was discarded and the particles were redispersed in water for an electron micrograph (FIG. 6). The micrograph shows that the particles fit in the growth pattern as predicted, being slightly smaller than those produced in 6 hours in Example I. The scale of the micrograph is 1 cm.=500 A.

Figure 7:
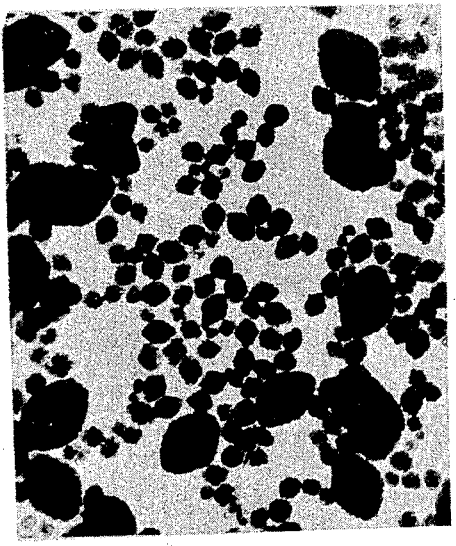
FIGURES 7 and 8 illustrate the particle size and shape of $Fe_2O_3$ particles produced by seeding.

EXAMPLE III 22.7 gms. of $Fe(NO_3)_3 \cdot 9H_2O$ were dissolved in 200 ml. of water and precipitated with 25 ml. of aqueous ammonia (28%) with stirring. After washing to remove electrolytes, 12.5 mls. of glacial acetic acid were added to the suspension about 200 ml. in volume, and stirred gently for 15 hours. 0.3 gm. of $Fe_2O_3$ seed—sol particles previously prepared at 100° centigrade which were spheroidal approximately 70 mµ in diameter—was added to the solution and the solution made up to 400 ml. with water. The seeded solution was placed in a reflux apparatus and refluxed for 24 hours. A sample of the sol was cooled and centrifuged at 10,000 r.p.m. for 30 minutes. The supernatant contained very little $Fe_2O_3$ and was discarded. The particles were redispersed in water and an electron micrograph made (FIG. 7). The micrograph showed a bimodal distribution of sizes. The ratio of $Fe_2O_3$ in solution to $Fe_2O_3$ as seed in this example was 13.3/1. The size range of the larger of the two size modes was approximately 100 to 170 mµ on the long axis with an estimated mean of 140 mµ. The smaller particles were about 50 mµ on the long axis. The scale of the micrograph is 1 cm.=500 A.

Figure 8:
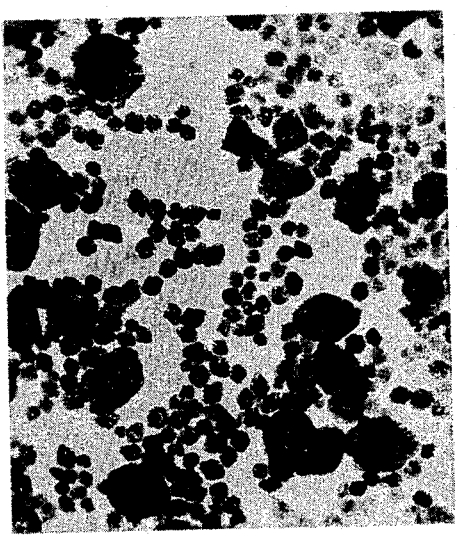

EXAMPLE IV 22.7 gms. of $Fe(NO_3)_3 \cdot 9H_2O$ were dissolved in 200 ml. of water and precipitated with 25 ml. of aqueous ammonia (28%). The precipitate was washed and filtered four times and dispersed in 200 ml. of water. 12 ml. of glacial acetic acid were added and the solution stirred gently for 15 hours. 0.6 gm. of $Fe_2O_3$ seed—sol particles previously made at 100° centigrade which were spheroidal approximately 70 mµ in diameter—was added to the solution and the solution made up to 400 ml. with water. The seeded solution was placed in a reflux apparatus and refluxed for 24 hours. A sample of the sol was cooled and centrifuged at 10,000 r.p.m. for 30 minutes. The supernatant contained very little $Fe_2O_3$ and was discarded. The particles were redispersed in water and an electron micrograph made (FIG. 8). The micrograph showed a bimodal distribution of sizes. The ratio of $Fe_2O_3$ in solution to $Fe_2O_3$ as seed in this example was 6.7/1. The size range of the larger of the two size modes is approximately 100 to 150 mµ with an estimated mean of 125 mµ on the long axis of the particle. The smaller particles were about 50 mµ on the long axis. The scale of the micrograph is 1 cm.=500 A.

Figure 9:
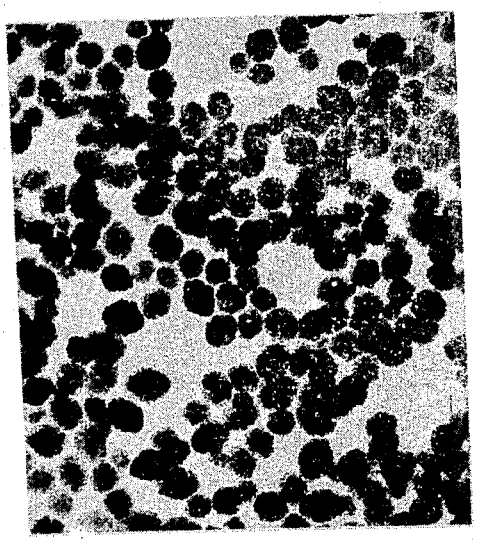
FIGURE 9 illustrates $Fe_2O_3$ particles produced by growth at 100° C.

EXAMPLE V 22.7 gms. of $Fe(NO_3)_3 \cdot 9H_2O$ were dissolved in 200 ml. of water and precipitated with 25 ml. concentrated ammonia with vigorous stirring with one quick pour. The precipitate was washed and filtered five times and dispersed in 200 ml. of water. 12 ml. of glacial acetic acid were added and the solution stirred gently for 15 hours. The solution was made up to 400 ml. with water and placed in a reflux apparatus with a temperature control set at 100° centigrade. The solution was refluxed for 24 hours at 100° centigrade after which a portion was cooled quickly to room temperature. The sample was centrifuged at 10,000 r.p.m. for 30 minutes, redispersed in water, and centrifuged at 5,000 r.p.m. for 45 minutes. The supernatant was discarded and the particles were redispersed in water for an electron micrograph (FIG. 9). The scale of the micrograph shown is 1 cm.=500 A. The micrograph shows the typical particles where neither temperature control is exercised nor seeding carried out, as a consequence of which little if any control could be maintained over the size of the particles.

I claim:

1. A method for preparing ferric oxide sols containing ellipsoidal particles having a preselected size comprising precipitating hydrous ferric oxide from a solution of a ferric salt with an inorganic base, washing the precipitate formed thereby until it is substantially free of electrolytes, suspending the hydrous ferric oxide in a solution of acetic acid until a clear red solution results, the ferric oxide content of the solution being less than 5 weight percent and the mole ratio of acetic acid to ferric oxide being less than 4 to 1, and heating the clear red solution at a temperature of about 80° C. for a time sufficient to produce the particles having the desired size.

2. A method for preparing ellipsoidal ferric oxide sol particles having a preselected size comprising precipitating hydrous ferric oxide from a solution of a ferric salt with an inorganic base, washing the precipitate formed thereby until it is substantially free of electrolytes, suspending the hydrous ferric oxide in a solution of acetic acid until a clear red solution results, the ferric oxide content of the solution being less than 5 weight percent and the mole ratio of acetic acid to ferric oxide being less than 4 to 1, heating the clear red solution at a temperature of about 80° C. for a time sufficient to produce the particles having the desired size and, separating the particles from the solution.

References Cited by the Examiner

UNITED STATES PATENTS 2,937,927   5/1960   Ayers _____ 23—200

OTHER REFERENCES

Weiser: Inorganic Colloid Chemistry, vol. II, The Hydrous Oxides and Hydroxides, Wiley and Sons, Inc., New York, (1935) pp. 44–46, 48, 49.

LEON D. ROSDOL, *Primary Examiner.*

JULIUS GREENWALD, ALBERT T. MEYERS, *Examiners.*

R. D. LOVERING, *Assistant Examiner.*